(12) United States Patent
Suzuki

(10) Patent No.: US 12,026,564 B2
(45) Date of Patent: Jul. 2, 2024

(54) IMAGE FORMING APPARATUS AND IMAGE PROCESSING APPARATUS

(71) Applicant: CANON KABUSHIKI KAISHA, Tokyo (JP)

(72) Inventor: Ryo Suzuki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/510,784

(22) Filed: Oct. 26, 2021

(65) Prior Publication Data

US 2022/0129713 A1 Apr. 28, 2022

(30) Foreign Application Priority Data

Oct. 28, 2020 (JP) ................................. 2020-180877

(51) Int. Cl.
*G06K 15/00* (2006.01)
*G06K 15/02* (2006.01)
*G06K 15/16* (2006.01)

(52) U.S. Cl.
CPC ......... *G06K 15/024* (2013.01); *G06K 15/002* (2013.01); *G06K 15/16* (2013.01); *G06K 15/1809* (2013.01); *G06K 15/4065* (2013.01); *G06K 15/408* (2013.01)

(58) Field of Classification Search
CPC .... G06K 15/024; G06K 15/002; G06K 15/16; G06K 15/1809; G06K 15/4065; G06K 15/408
See application file for complete search history.

(56) References Cited

U.S. PATENT DOCUMENTS

| | | | | |
|---|---|---|---|---|
| 6,633,393 | B1 * | 10/2003 | Fukano | B41J 3/60 358/1.12 |
| 7,546,056 | B2 | 6/2009 | Konno | |
| 2003/0081260 | A1 * | 5/2003 | Suzuki | H04N 1/00278 358/302 |
| 2004/0015404 | A1 * | 1/2004 | McCarthy | G06Q 10/02 705/26.1 |
| 2006/0062997 | A1 * | 3/2006 | Murakami | B41M 5/5254 428/522 |
| 2006/0204270 | A1 * | 9/2006 | Abe | G03G 15/50 399/82 |
| 2011/0058871 | A1 * | 3/2011 | Motoyama | G03G 15/232 399/364 |

FOREIGN PATENT DOCUMENTS

JP 08-73073 A * 3/1996
JP 2005-181876 A 7/2005

* cited by examiner

*Primary Examiner* — Huo Long Chen
(74) *Attorney, Agent, or Firm* — Venable LLP

(57) ABSTRACT

An image forming apparatus includes an image forming unit configured to form an image on a sheet of perforated paper; an input unit configured to receive first information and second information; and a processor configured to display an alarm display without performing sheet-passing of the sheet of perforated paper. The first information is information concerning the sheet of perforated paper on which an image is to be formed by the image forming unit and the second information is information concerning whether to perform automatic double-sided printing on the sheet of perforated paper or not. The processor is configured to display the alarm display in a case where the automatic double-sided printing is instructed and it is determined that the sheet of perforated paper has a cut-off portion.

13 Claims, 9 Drawing Sheets

THIS PRINTING MATERIAL SHAPE IS NOT COMPATIBLE WITH AUTOMATIC DOUBLE-SIDED PRINTING.
 PLEASE SET SURFACE-PRINTED PAPER INTO FEEDING UNIT TO PRINT ON REVERSE SIDE, OR USE RECORDING MATERIAL THAT HAS SHAPE AVAILABLE FOR AUTOMATIC DOUBLE-SIDED PRINTING.

OK

IMAGE FORMING APPARATUS AND IMAGE PROCESSING APPARATUS

BACKGROUND OF THE INVENTION

Field of the Invention

The present disclosure relates to an image forming apparatus, such as a copier that has a function to perform automatic double-sided printing to automatically print on both sides of the printing material, a facsimile machine, a printer, and a multifunction apparatus.

Description of the Related Art

When performing printing (image forming) on both sides of the sheet-shaped printing material, an electrophotographic image forming apparatus reverses the printing material, on which an image has been formed on one surface of the same, then performs image forming on the other surface. At this time, the printing material is switched back at a reversing unit in the image forming apparatus to reverse the printed surface. The function of automatically reversing the printing surface of the printing material and performing the double-sided printing in the image forming apparatus is called an automatic double-sided printing function.

In some cases, the image forming apparatus that performs automatic double-sided printing cannot automatically perform double-sided printing depending on the characteristics of the printing material. For example, as to "printing material having a short length in a conveyance direction which is too short to pass through the conveyance section (circulation conveyance section) for switchback" and "printing material which is too rigid to pass through the conveyance section", it is difficult to perform the automatic double-sided printing. When automatic double-sided printing is performed for the printing material having such characteristics, faulty feeding may occur in the circulation conveyance section. Therefore, in this case, it is determined whether or not the printing material can be used for automatic double-sided printing before the printing material reaches the circulation conveyance section so as not to perform automatic double-sided printing on the printing material that is judged to be unusable for automatic double-sided printing.

Japanese Patent Application Laid-open No. 2005-181876 discloses an image forming apparatus in which a built-in detection unit detects a length of the printing material in a conveyance direction. This image forming apparatus determines whether or not automatic double-sided printing is possible or not based on a detection result of the length of the printing material in the conveyance direction. In a case where automatic double-sided printing is not possible, an instruction to perform manual double-sided printing is issued. U.S. Pat. No. 7,546,056 B2 describes an image forming apparatus which determines whether or not automatic double-sided printing is possible or not based on a paper type of the printing material.

The electrophotographic image forming apparatus is often used in a field of convenience printing such as POD (print on demand). Therefore, as to the image forming apparatus, it is required to meet various needs related to image quality and the printing material. For example, the image forming apparatus is used when creating a price tag, a business card, an admission ticket, a delivery note, and the like. Therefore, there is a demand for the image forming apparatus which is capable of printing on a medium that has been perforated in advance and separatable at the perforated portion (for example, perforated paper, label paper, etc.). There are many types of perforations according to the number of dividing surfaces of the printing material (for example, for 2 divisions, 4 divisions, 8 divisions, 9 divisions, EIAJ standard delivery note, etc.).

In a case where the separatable printing material is once used and is separated, the separated material may cause faulty sheet-passing in the circulation conveyance section in the automatic double-sided printing. With reference to FIG. 11A and FIG. 11B, a sheet-passing state of a sheet of perforated paper when a part of the same is separated will be described. The perforated paper shown in FIG. 11A is an A4 size (210 mm×297 mm) printing material having a basis weight of 80 g/m² and is perforated for dividing it into nine parts. One surface (surface of upper right part) of this perforated paper has already been used and separated. Therefore, the length in the conveyance direction of the perforated paper is 297 mm at a line (X) which passes through three surfaces in the carrying direction, and 198 mm at a line (Y) which passes through two surfaces since one surface is used.

FIG. 11B shows the behavior of the perforated paper (printing material) shown in FIG. 11A at the time of sheet-passing with its cut-off or cut-out portion to be a leading edge in the passing through the direction. FIG. 11B shows a cross section of a sheet of perforated paper and an original conveyance pass at the time when the position of a broken line A, which is orthogonal to the conveyance direction, passes through a bent portion of the original conveyance path. A solid line in FIG. 11B shows a posture of the printing material at line X where there is no notch in the conveyance direction, and the broken line shows a posture of the printing material at line Y where there is a notch at the leading edge of the conveyance direction.

Assuming that the tip position of the notch is B, as to BY (the intersection of B and Y), which is a leading edge of the notch, and BX (the intersection of B and X), which has no notch, the posture of the printing material at BY and the posture of the printing material at BX do not match, and the positions of BX and BY are separated from each other. This is because the position of BX, having no notch on a front side in the conveyance direction, is affected by the displacement of the position AX (intersection of A and X) which is in front of the position BX while BY, which is the leading edge of the notch, is not affected by the displacement of the front position. As shown in FIG. 11B, when the posture of the leading edge of the notch is significantly different from that of the tip of the portion without the notch, the leading edge of the notch causes the faulty sheet-passing on the original conveyance path. That is, in a case where the perforated paper is passed with the notch as the leading edge, the faulty sheet-passing may occur.

As to an image forming apparatus in which a length of the printing material acceptable for the automatic double-sided printing in the conveyance direction is 150 mm or more and a basis weight acceptable for the automatic double-sided printing is 200 g/m² or less, in the prior art, the perforated paper shown in FIG. 11A is determined to be available for automatic double-sided printing. When automatic double-sided printing is performed for the perforated paper shown in FIG. 11A, as to a first surface of the perforated paper, the sheet-passing can be performed without any problem with the leading edge being the side having no notch. However, when performing the sheet-passing for a second surface of the paper, a leading edge and a trailing edge of the printing material are exchanged when the front and back are reversed by switching back at the reversing portion, so that the perforated paper is passed with its notch being at the leading edge. At this time, the faulty sheet-passing may occur. Therefore, there is a demand for an image forming apparatus that can prevent the faulty sheet-passing during the automatic double-sided printing even if the printing material is in a partial cut-off state.

SUMMARY OF THE INVENTION

An image forming apparatus according to the present disclosure includes: an image forming unit configured to form an image on a sheet of perforated paper which has been perforated; an input unit configured to receive first information and second information, wherein the first information is information concerning the sheet of perforated paper on which an image is to be formed by the image forming unit and wherein the second information is information concerning whether to perform automatic double-sided printing on the sheet of perforated paper or not; and a processor configured to display an alarm display in a case where the automatic double-sided printing is instructed and it is determined that the sheet of perforated paper has a cut-off portion based on the information input from the input unit.

Further features of the present invention will become apparent from the following description of exemplary embodiments (with reference to the attached drawings).

DESCRIPTION OF THE EMBODIMENTS

In the following, at least one preferred embodiment of the present disclosure is described with reference to the drawings. However, the dimensions, materials, shapes, relative arrangements, etc., of components described in the following embodiments should be appropriately modified according to a configuration of an apparatus to which the present disclosure is applied and various conditions. Therefore, unless otherwise specified, the scope of the present disclosure is not intended to be limited to the above.

Structure of the Image Forming Apparatus

Figure 1:
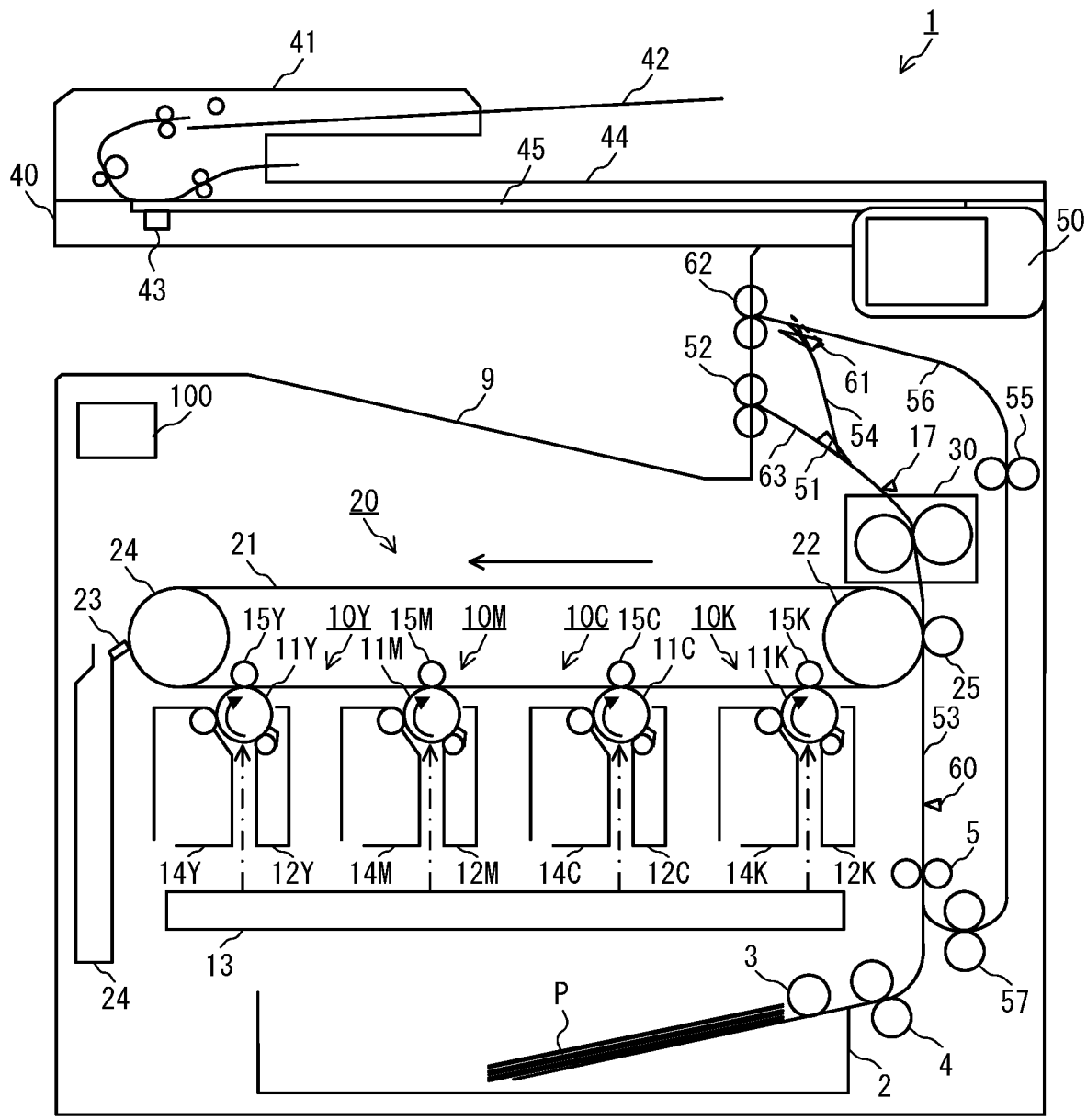
FIG. 1 is an explanatory configuration diagram of an image forming apparatus.

FIG. 1 is an explanatory configuration diagram of an image forming apparatus. The image forming apparatus 1 performs electrophotographic image forming on printing material P. Therefore, the image forming apparatus 1 performs each process of forming an image on an image bearing member, transferring the image from the image bearing member to the printing material P, and fixing the image on the printing material P. The image forming apparatus 1 of the present embodiment is a four-color full-color multifunction printer (color image forming apparatus) using an A4 size system electrophotographic process. Here, "A4 size system" refers to a system in which sheet-passing is performed with the printing material in vertical feed. "Vertical feed" is to pass the printing material with a long side of the same being along with a conveyance direction. The image forming apparatus 1 may be a monochrome multifunction printer or a single-function printer.

A controller 100 is installed in the image forming apparatus 1. The controller 100 comprehensively controls operations of various components in the image forming apparatus based on the obtained print information (image data, printing material information, etc.), and forms (prints) an image on the printing material P. The printing material P is a sheet-like member on which an image can be formed, such as plain paper, thick paper, OHP paper, coated paper, label paper, binder paper, tab paper, perforated paper, and the like. The perforated paper is the printing material P which has been perforated. The perforated paper is cut along perforations thereof.

The image forming apparatus 1 forms a multicolor image by superimposing four-color developers (hereinafter referred to as "toner") of yellow (Y), magenta (M), cyan (C), and black (K). Therefore, the image forming apparatus 1 has image forming units 10Y, 10M, 10C, and 10K to form toner images of respective colors. The basic configurations of the image forming units 10Y, 10M, 10C, and 10K of each color are the same. To distinguish the colors, Y, M, C, and K are added as suffixes to reference characters. However, in the following description, the suffixes are omitted when it is not necessary to distinguish the colors.

The image forming unit 10 has a rotating drum type electrophotographic photosensitive member (hereinafter referred to as "photosensitive drum 11") as the image bearing member on which an image is formed. A charging device 12 and a developing device 14 are provided around the photosensitive drum 11. The developing device 14 has toner chambers for accommodating toner of respective colors. A laser scanner unit 13 which exposes the photosensitive drum 11 with laser light is arranged in the vicinity of the image forming unit 10. A cassette 2 for accommodating the printing material P is arranged in a lower part of the laser scanner unit 13. A transfer unit 20 is provided on an upper side of the image forming unit 10.

The transfer unit 20 has an intermediate transfer belt 21, a driving roller 22 which rotationally drives the intermediate transfer belt 21, and a tension roller 24. On the inside of the intermediate transfer belt 21, four primary transfer rollers 15 are arranged along a belt surface of the intermediate transfer belt 21. Each primary transfer roller 15 is arranged to oppose to a corresponding photosensitive drum 11 of each image forming unit 10 via the intermediate transfer belt 21. The upper surface of the photosensitive drum 11 of each image forming unit 10 is in contact with a lower surface of the intermediate transfer belt 21 with its upper portion being at a position of the primary transfer roller 15. This contact portion corresponds to a primary transfer unit. A portion of the intermediate transfer belt 21 is backed up by the driving roller 22, and a secondary transfer roller 25 is provided outside the portion backed up by the driving roller 22. The intermediate transfer belt 21 is in contact with the secondary transfer roller 25, and this contact portion corresponds to the second transfer unit. A portion of the intermediate transfer belt 21 is backed up by the tension roller 24, and an intermediate transfer belt cleaner 23 is provided outside the portion backed up by the tension roller 24.

The image forming apparatus 1 is provided with an original conveyance path 53 which conveys the printing material P stored in the cassette 2 upward. The original conveyance path 53 is provided with a feeding roller 3, a separation roller pair 4, a registration roller pair 5, a secondary transfer roller 25, and a fixing unit 30 in this order, from an upstream side of the conveyance direction of the printing material P. On a downstream side of the registration roller pair 5, a conveyance sensor 60 for detecting the printing material P to be conveyed is provided. The original conveyance path 53 branches into an original conveyance path 63 and the original conveyance path 54 on the downstream side of the fixing unit 30. A fixing discharge sensor 17 to detect the printing material P is provided between the fixing unit 30 and the branch portion. A double-sided flapper 51 is provided at the branch position. The original conveyance path 63 is provided with a discharge roller pair 52. The printing material P conveyed to the original conveyance path 63 is discharged to an original discharge tray 9 by the discharge roller pair 52.

The original conveyance path 54 is provided with a pair of reversing roller pair 62. When performing the automatic double-sided printing, the printing material P is conveyed to the original conveyance path 54, and the conveyance direction is reversed by the reversing roller pair 62. The original conveyance path 54 is provided with a double-sided original conveyance path 56 in a direction in which the conveyance direction of the printing material P is reversed. The printing material P is conveyed to the double-sided original conveyance path 56 by reversing the conveying direction by the reversing roller pair 62. A switching flapper 61 is provided at a branch position between the original conveyance path 54 and the double-sided original conveyance path 56. When a trailing edge of the printing material P passes through a position of the switching flapper 61, the switching flapper 61 is switched so that the printing material P is conveyed to a side where the double-sided original conveyance path 56 is positioned.

The double-sided original conveyance path 56 is provided with a double-sided conveyance roller pair 55 and a double-sided original re-feeding roller pair 57. The printing material P is conveyed to the original conveyance path 53 via the double-sided original conveyance path 56 by the double-sided conveyance roller pair 55 and the double-sided original re-feeding roller pair 57. The double-sided original conveyance path 56 is configured to merge into a portion of the original conveyance path 53. A circulation conveyance section is formed by the original conveyance path 54, the double-sided original conveyance path 56, the reversing roller pair 62, the double-sided conveyance roller pair 55, and the double-sided original re-feeding roller pair 57.

The image forming apparatus 1 is provided with an image reader 40 at its top. The image reader 40 has the function of reading an image of an original with a reader scanner 43, which is an optical sensor, to convert it into an image signal. The image reader 40 is provided with an original feeding unit 41. The original feeding unit 41 feeds the original, which is set in the original tray 42 with its image printed surface upward, one by one from the first page to a reading position of the reader scanner 43.

The reader scanner 43 reads the original image from the original sent by the original feeding unit 41. The reader scanner 43 includes a light irradiation unit (not shown) and an image sensor (not shown). The light irradiation unit irradiates the original with light. The reflected light of the light emitted from the light irradiation unit to the original is focused on the imaging surface, thereby the image sensor receives the light. The image sensor receives and converts the reflected light of the original image into an image signal. The reader scanner 43 reads the original image line by line in a main scanning direction (direction orthogonal to an original conveyance direction). The image reader 40 reads the images of the entire pages by reading the original image line by line from the conveyed original. When reading the original without using the original feeding unit 41, a user lifts the original feeding unit 41 and places the original on a platen glass 45. In this case, the reader scanner 43 reads the original image while moving from left to right in FIG. 1.

An operation panel 50 is provided on a front surface of a housing of the image forming apparatus 1. The operation panel 50 is a user interface including an input interface and an output interface. The input interface includes various key buttons, a touch panel, and the like. The output interface includes a display, a speaker, and the like.

<Controller>

Figure 2:
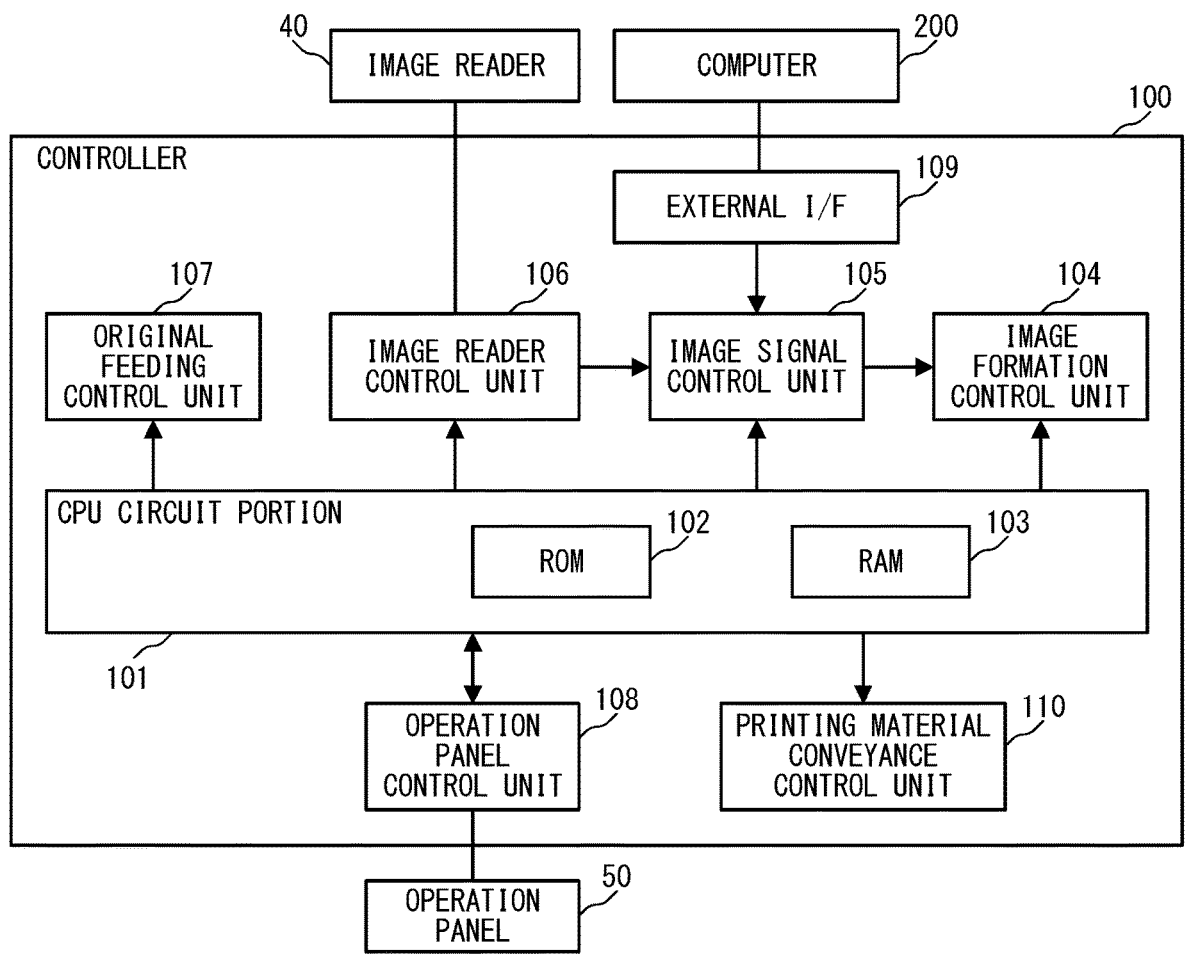
FIG. 2 is an explanatory configuration diagram of a controller.

FIG. 2 is an explanatory configuration diagram of a controller 100. The controller 100 is mainly described with parts necessary for explaining the operation of the present embodiment, and a description for the other parts known as image control units is omitted. The controller 100 can communicate, by electrically connecting the same, with an external image processing apparatus such as a computer 200, an input device such as the image reader 40, and the operation panel 50. The controller 100 controls the operation of each component in the image forming apparatus based on the print information (image data, printing material information, etc.) obtained from the computer 200 or the operation panel 50 to thereby form an image on the printing material P. The controller 100 obtains image data from the image reader 40 to obtain the printing material information and the like from the operation panel 50, for example, when performing a copying operation.

The controller 100 includes a CPU (Central Processing Unit) circuit portion 101. The CPU circuit portion 101 includes a calculation unit such as a CPU, a ROM (Read Only Memory) 102, and a RAM (Random Access Memory) 103. The CPU circuit portion 101 controls the operation of the image forming apparatus 1 by executing the computer program stored in the ROM 102. The RAM 103 provides a work area for executing a computer program. An original feeding control unit 107, an image reader control unit 106, an image signal control unit 105, an image formation control unit 104, an operation panel control unit 108, and a printing material conveyance control unit 110 are connected to the CPU circuit portion 101. An external I/F 109 which controls communication with a computer 200 is connected to the image signal control unit 105. The image reader control unit 106 is connected to the image reader 40. The operation panel control unit 108 is connected to the operation panel 50. The operations of the original feeding control unit 107, the image reader control unit 106, the image signal control unit 105, the image formation control unit 104, the operation panel control unit 108, and the printing material conveyance control unit 110 are controlled by the CPU circuit portion 101.

The original feeding control unit 107 controls the original feeding operation and the conveying operation of the original by the original feeding unit 41. The image reader control unit 106 controls the operation of the reader scanner 43 and controls the conversion into an image signal. The image signal control unit 105 obtains the image signal generated by the reader scanner 43 via the image reader control unit 106 and performs image processing on the obtained image signal. Specifically, the image signal control unit 105 performs image processing after converting an image signal which is an analog signal into an image signal which is a digital signal. The image signal control unit 105 converts the digital signal after image processing into an image information signal and outputs it to the image formation control unit 104. Further, the image signal control unit 105 also performs image processing on an image signal which is a digital signal input from the computer 200 via an external I/F 109. The image signal control unit 105 can convert the digital signal after the image processing into the image information signal to output to the image formation control unit 104.

The image formation control unit 104 controls the operation of each component concerning the image formation operation based on the image information signal obtained from the image signal control unit 105. Details of the operation of each component will be described later. The printing material conveyance control unit 110 performs conveyance control of the printing material P. An image is formed on the printing material P by the operation control of each component by the image formation control unit 104 and the conveyance control of the printing material P by the printing material conveyance control unit 110.

The operation panel control unit 108 transmits/receives information between the operation panel 50 and the CPU circuit portion 101. The operation panel 50 transmits content input by the input interface to the CPU circuit portion 101. The operation panel 50 outputs information from the output interface under control of the CPU circuit portion 101.

Figure 3:
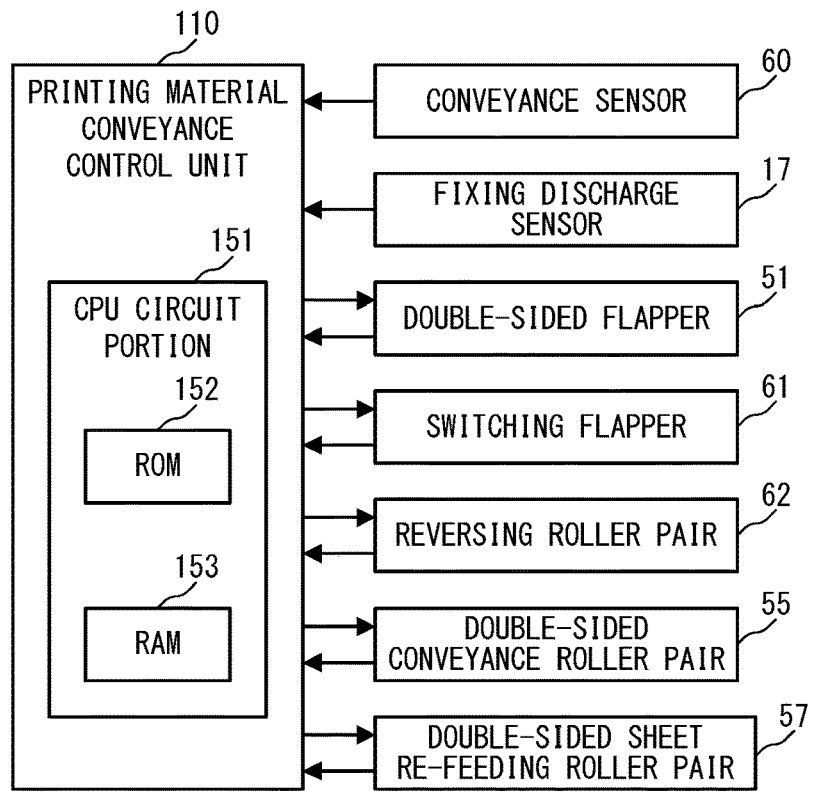
FIG. 3 is an explanatory diagram of a conveyance control unit of the printing material.

FIG. 3 is an explanatory diagram of the printing material conveyance control unit 110. The printing material conveyance control unit 110 has a CPU circuit portion 151 which is separated from the controller 100. The CPU circuit portion 151 has a ROM 152 and a RAM 153. The CPU circuit portion 151 controls the operation of each component concerning the conveyance of the printing material P by executing the computer program stored in the ROM 152. The RAM 153 provides a work area for executing a computer program. FIG. 3 mainly represents parts necessary for explaining the operation of the present embodiment, and other parts known as conveyance control units are omitted. The printing material conveyance control unit 110 of the present embodiment obtains detection results of the conveyance sensor 60 and the fixing discharge sensor 17, respectively. Further, the printing material conveyance control unit 110 of the present embodiment controls the operations of the double-sided flapper 51, the switching flapper 61, the reversing roller pair 62, the double-sided conveyance roller pair 55, and the double-sided original re-feeding roller pair 57.

The image forming operation by the image forming apparatus 1 having the above configuration will be described with reference to FIG. 1 to FIG. 3.

The controller 100 starts the image forming operation when the operation panel 50 or the computer 200 instructs an execution of the image forming. The CPU circuit portion 101 instructs the image formation control unit 104 to start the image formation process by obtaining the instruction to execute image formation from the operation panel 50 or the computer 200. When the CPU circuit portion 101 instructs the image formation control unit 104 to start the image formation process, the image formation control unit 104 controls the photosensitive drum 11 in the image forming unit 10 and the driving roller 22 in the transfer unit 20 to start rotational driving at a predetermined speed. The photosensitive drum 11 rotates clockwise in the drawing, and the driving roller 22 rotates the intermediate transfer belt 21 in a direction in which the intermediate transfer belt 21 rotates forward with respect to the rotation direction of the photosensitive drum 11 (counterclockwise in the drawing).

The image forming unit 10 starts image forming (the toner image) on the photosensitive drum 11. The image forming unit 10 first uniformly charges the surface of the photosensitive drum 11 with a predetermined potential and polarity by the charging device 12. The laser scanner unit 13 scans the charged surfaces of the corresponding drums 11Y, 11M, 11C, and 11K with laser light modulated according to the image information signals of each color of yellow, magenta, cyan, and black. As a result, electrostatic latent images of the corresponding colors are formed on the photosensitive drums 11Y, 11M, 11C, and 11K. The developing device 14 develops by electrostatically adhering toner of the corresponding color to the electrostatic latent image to form the toner image on the photosensitive drum 11. A yellow toner image is formed on the photosensitive drum 11Y. A magenta toner image is formed on the photosensitive drum 11M. A cyan toner image is formed on the photosensitive drum 11C. A black toner image is formed on the photosensitive drum 11K.

The toner image of each color formed on the photosensitive drum 11Y, 11M, 11C, and 11K is superimposed and transferred on the intermediate transfer belt 21. This is done by applying a predetermined potential to the primary transfer roller 15 opposing to the photosensitive drum 11 to electrostatically transfer the toner image, at the primary transfer unit, on the photosensitive drum 11 onto the intermediate transfer belt 21. Depending on space between each photosensitive drum 11Y, 11M, 11C, and 11K and a rotation speed of the intermediate transfer belt 21, a transfer timing of the toner image from each photosensitive drum 11Y, 11M, 11C, and 11K to the intermediate transfer belt 21 is adjusted. As a result, the toner image of each color is superimposed. A full-color toner image is formed on the intermediate transfer belt 21 by superimposing the toner image of each color. The intermediate transfer belt 21 is an image bearing member which carries the transferred full-color toner image. The transferred toner image is conveyed to the second transformer unit by the rotational driving of the driving roller 22. The remaining toner on the photosensitive drum 11 that is not transferred onto the intermediate transfer belt 21 by the primary transfer unit is removed by a cleaning member (not shown).

The printing material conveyance control unit 110 feeds the printing material P from the cassette 2 in parallel with toner image forming operations performed by the image formation control unit 104. When the feeding operation is started, the printing material P is separated from the cassette 2 one by one by the feeding roller 3 and the separation roller pair 4, and is fed to the original conveyance path 53 and conveyed to the registration roller pair 5. The registration roller pair 5 does not rotate at a timing when the printing material P is conveyed. Therefore, the leading edge of the printing material P collides with a nip portion of the registration roller pair 5 to form a loop on the leading edge side. As a result, the skew of the printing material P is corrected. The registration roller pair 5 starts rotation after skew correction to convey the printing material P. At this time, the registration roller pair 5 is synchronized with the toner image on the intermediate transfer belt 21, according to a timing when the leading edge of the printing material P is detected by the conveyance sensor 60 to adjust the timing for conveying the printing material P to the second transfer unit.

In the second transfer unit, the toner image on the intermediate transfer belt 21 is transferred onto the printing material P. This is performed by applying a secondary transfer bias having a reversed polarity, with respect to the charging polarity of the toner, to the secondary transfer roller 25 at a timing when the toner image and the printing material P are conveyed to the second transfer unit. By applying the secondary transfer bias to the secondary transfer roller 25, the toner image is electrostatically transferred from the intermediate transfer belt 21 to the printing material P. That is, the printing material P is sandwiched and conveyed by the second transfer unit to thereby the toner image is transferred to one surface of the printing material P. The printing material P to which the toner image has been transferred is conveyed to the fixing unit 30. The remaining toner on the intermediate transfer belt 21 that is not transferred on the printing material P by the second transfer unit is removed by the intermediate transfer belt cleaner 23.

On the printing material P to which the toner image has been transferred, the toner image is fixed by heating and pressurizing the toner image by the fixing unit 30. The fixing unit 30 is heated to a temperature required for toner fixing when starting an image forming operation and is controlled to maintain the temperature until the printing material P reaches the fixing unit 30. The toner image on the printing material P is fixed by heating and pressurizing the same at a fixing nip portion (not shown) of the fixing unit 30. When the printing material P is discharged to an outside of the apparatus, it is conveyed to the original discharge tray 9 via the discharge roller pair 52 by being sandwiched and conveyed by the fixing nip portion.

At a time of automatic double-sided printing, the position of the double-sided flapper 51 is switched to guide the printing material P to the original conveyance path 54. The printing material P guided by the original conveyance path 54 is conveyed by the fixing unit 30 and reaches the switching flapper 61, which is stopped by its weight at a position shown by the solid line in FIG. 1. The printing material P reaches the reversing roller pair 62 while pushing up the switching flapper 61 by being further conveyed, and the leading edge thereof protrudes from the image forming apparatus 1 to the outside. When the trailing edge of the printing material P passes through the switching flapper 61 and reaches the double-sided reversing position on the upstream side by a predetermined distance with respect to the reversing roller pair 62, the switching flapper 61 returns to a position shown by the solid line in FIG. 1 due to its weight. Here, the reversing roller pair 62 rotates in the reverse direction so that the printing material P is conveyed to the double-sided original conveyance path 56 along an upper surface of the switching flapper 61.

The printing material conveyance control unit 110 detects the trailing edge of the printing material P based on a detection result of the fixing discharge sensor 17 and stops driving in the forward rotation of a motor (not shown) that drives the reversing roller pair 62 based on the detected timing. The printing material conveyance control unit 110 conveys the printing material P from the original conveyance path 54 to the double-sided original conveyance path 56 by rotating the motor in the forward and reverse directions to drive the reversing roller pair 62. The printing material P conveyed to the double-sided original conveyance path 56 is conveyed to the registration roller pair 5. After that, the printing material P is conveyed from the registration roller pair 5 to the second transfer unit to thereby form an image d again. By passing through the double-sided original conveyance path 56, as to the printing material P, the printing surface on which the image is formed is inverted. Therefore, when the image is formed again, the image is formed on a surface on which the image of the printing material P is not formed.

<Print Information>

Figure 4:
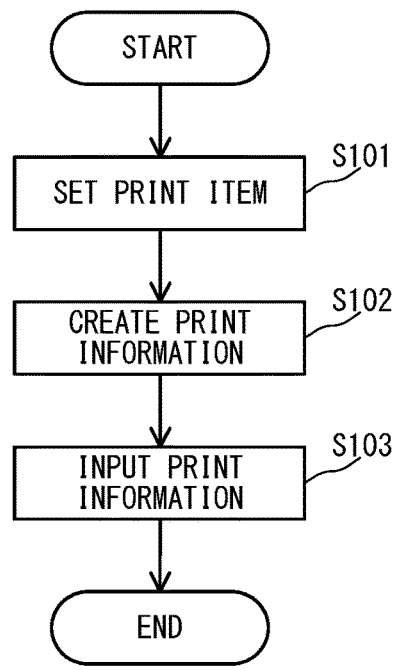
FIG. 4 is a flowchart representing an input processing of print information.

FIG. 4 is a flowchart representing an input process of the print information to the image forming apparatus 1. The print information includes image data representing an image to be printed as described above, information necessary for forming an image on the printing material P such as the printing material information, and the like. The printing material information and the like are, for example, information concerning a type of the printing material, a printing surface, the number of copies to be printed, and a feeding method, for example. Here, a print process for printing an image created by a user using an application or the like on a computer 200 will be described. In addition to the print process, the above process can be applied to the copy process for duplicating the original image. Further, the print information may be input by the operation panel 50. In this case, the CPU circuit portion 101 creates print information.

When the user requests printing of an image via the application, the computer 200 issues a print request to the printer driver. The print request may be issued directly from the application to the printer driver or may be issued to the printer driver via the interface provided by the application's operating system. The print request initiates a print processing procedure by the printer driver.

The printer driver displays a screen for prompting the setting of print items (hereinafter, referred to as "print item setting screen") on a display of the computer 200, and prompts the user to set the print item (STEP S101). The print items that can be set on the print item setting screen include a type of printing material and the feeding method. The print items specified here are necessary items for explaining the present embodiment and are not limited to these items. When the setting of the print item is completed, the printer driver creates print information based on the set print item (STEP S102). The computer 200 transmits the print information created by the printer driver to the image forming apparatus 1 (STEP S103).

When the print information is created using inputs from the operation panel 50, the print item setting screen is displayed on a display of the operation panel 50. The user operates various key buttons and the touch panel of the operation panel 50 to set print items (STEP S101). The CPU circuit portion 101, after receiving the input from the operation panel 50, creates the print information based on the set print items (STEP S102).

Figure 5:
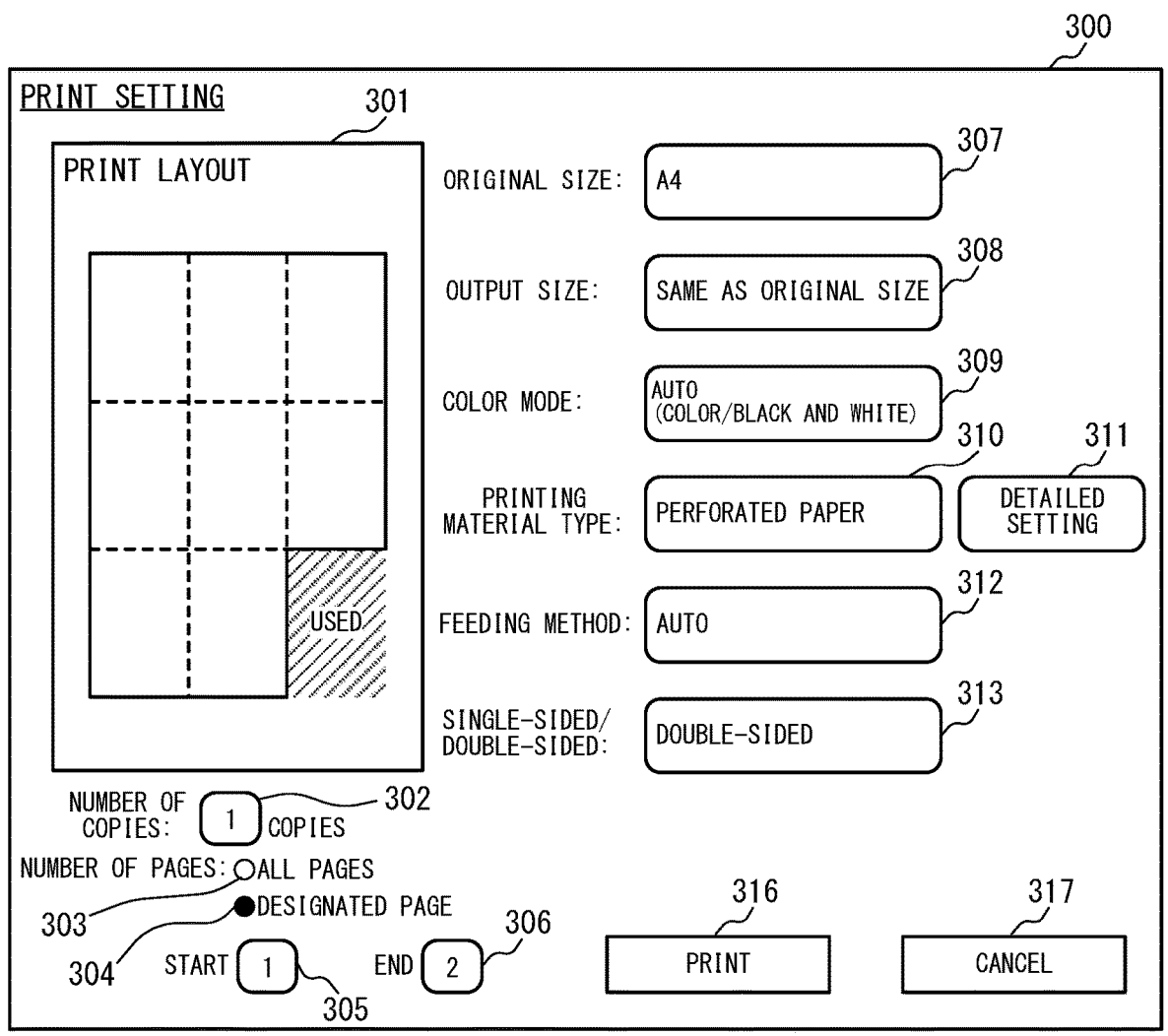
FIG. 5 is an explanatory diagram of a print item setting screen.

FIG. 5 is an example diagram of the print item setting screen used in the process of S101. The print item setting screen 300 includes a layout display 301 for the printed matter, "THE NUMBER OF COPIES" text box 302, "PAGE" radio buttons 303, 304, "START" text box 305, and "END" text box 306. The print item setting screen 300 includes "ORIGINAL SIZE" pull-down menu 307, "OUTPUT SIZE" pull-down menu 308, "COLOR MODE" pull-down menu 309, "PRINTING MATERIAL TYPE" pull-down menu 310, and "DETAILED SETTING" button 311.

The print item setting screen 300 includes "FEEDING METHOD" pull-down menu 312, "SINGLE-SIDED/DOUBLE-SIDED" pull-down menu 313, "PRINT" button 316, and "CANCEL" button 317.

The following values are set for each of the print items in the print item setting screen 300. The value input to the "NUMBER OF COPIES" text box 302 is set as the number of output copies of the printed matter. The values selected or input to "PAGE" radio buttons 303, 304, "START" text box 305, and "END" text box 306 are set as a print page range. When the radio button 303 is selected, all pages created by the user are set as the print page range. When the radio button 304 is selected, the values input to "START" text box 305 and "END" text box 306 are set as the print page range.

The item selected in "ORIGINAL SIZE" pull-down menu 307 is set as the size of the image for one page. In "ORIGINAL SIZE" pull-down menu 307, it is possible to select a standard size such as "A4" or "LTR". The item selected in "OUTPUT SIZE" pull-down menu 308 is set as the size of the image to be output. In "OUTPUT SIZE" pull-down menu 308, it is possible to select "SAME AS ORIGINAL SIZE" or the standard size such as "A4" or "LTR". The item selected in "COLOR MODE" pull-down menu 309 is set as a color mode when printing. In "COLOR MODE" pull-down menu 309, it is possible to select any of "AUTO (COLOR/BLACK AND WHITE)", "COLOR", AND "BLACK AND WHITE".

The item selected in "PRINTING MATERIAL TYPE" pull-down menu 310 is set as the type of printing material on which the image is formed. The printing material includes "PLAIN PAPER", "THIN PAPER", "CARDBOARD", "HIGH-QUALITY PAPER", "GLOSSY PAPER", "POSTAL CARD FOR INKJET", "POSTCARD", "GLOSSY POSTCARD", "GLOSSY FILM", "PHOTO-CARD", etc., for example. Further, "T-SHIRT TRANSFER PAPER", "BACK PRINT FILM", "TRANSPARENCY FILM", "ENVELOPE", "LABEL PAPER", "PERFORATED PAPER" and the like can be set for the printing material. As to "DETAILED SETTING" button 311, it is used when detailed setting of the printing material is required (for example, the number of divided surfaces of the perforated paper). When "DETAILED SETTING" button 311 is pressed, the printing material setting screen described later is displayed on the display of the computer 200, and the detailed setting of the printing material becomes possible.

The item selected in "FEEDING METHOD" pull-down menu 312 is set as the feeding method of the printing material P in the image forming apparatus 1. In "FEEDING METHOD" pull-down menu 312, "AUTOMATIC", "CASSETTE", and "MANUAL FEED" can be set as the feeding method. According to the item selected in "SINGLE-SIDED/DOUBLE-SIDED" pull-down menu 313, the printing surface to be used when printing on the printing material is set. In "SINGLE-SIDED/DOUBLE-SIDED" pull-down menu 313, either "SINGLE-SIDED" (single-sided printing) or "DOUBLE-SIDED" (double-sided printing) can be set.

The contents set in the print item setting screen 300 are stored in a storage of the computer 200 together with the image data. When "PRINT" button 316 in the print item setting screen 300 is pressed, the printer driver creates the print information based on the image data and the setting contents of the print item setting screen 300. The printer driver sends the created print information to the image forming apparatus 1 and closes the print item setting screen 300. When "CANCEL" button 317 is pressed, the printer driver closes the print item setting screen 300 to end the process.

When the operation panel 50 is used, the contents set in the print item setting screen 300 are stored in the RAM 103 of the CPU circuit portion 101. When "PRINT" button 316 of the print item setting screen 300 is pressed, the CPU circuit portion 101 creates the print information based on the image data and the setting contents of the print item setting screen 300.

Figure 6:
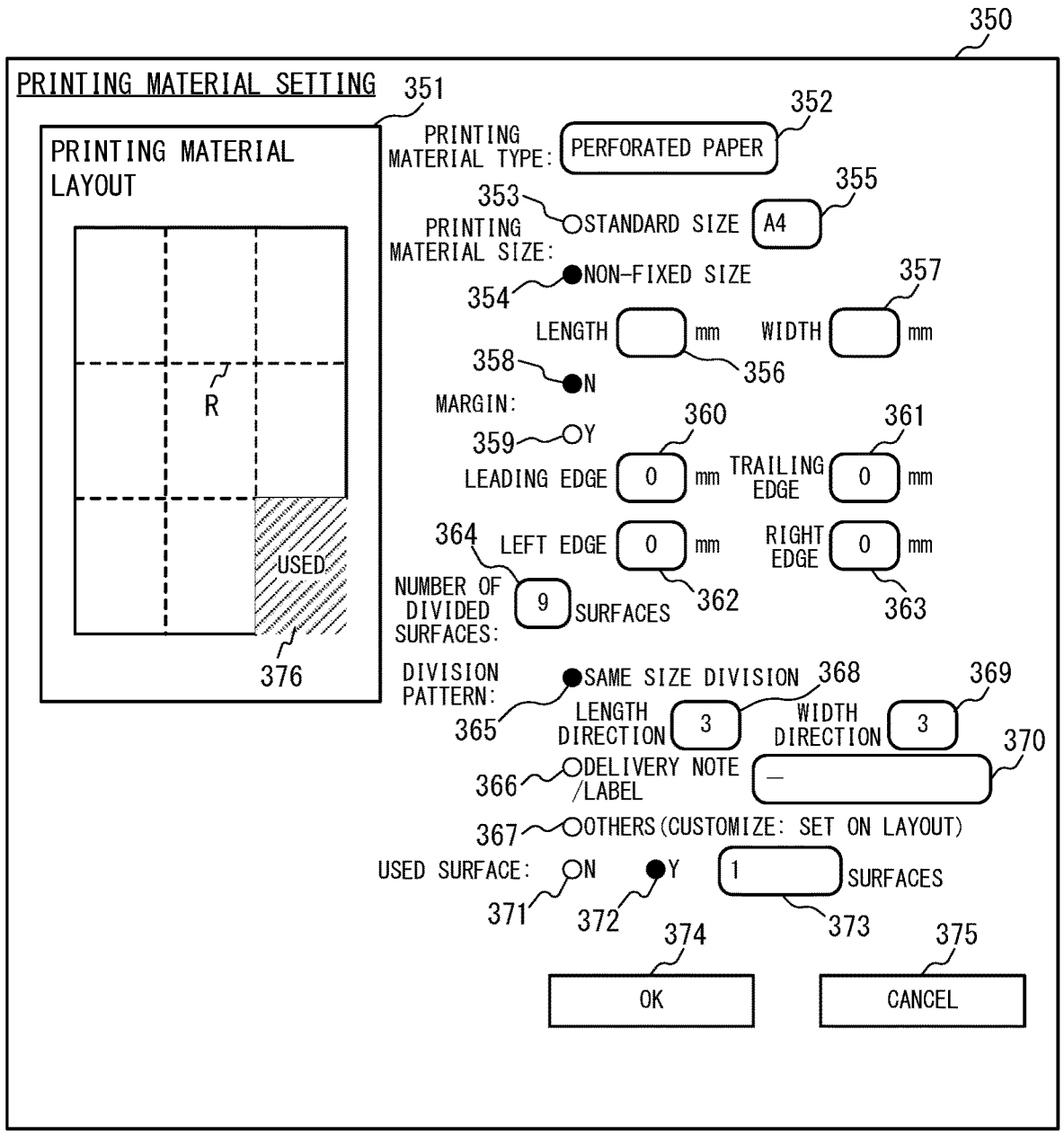
FIG. 6 is an explanatory diagram of printing material setting screen

FIG. 6 is an exemplary diagram of the printing material setting screen displayed when "DETAILED SETTING" button 311 in the print item setting screen 300 is pressed. When creating print information, the contents set by the printing material setting screen 350 are also included in the print information. In addition to the method using the printing material setting screen 350, for example, the CPU circuit portion 101 may automatically set the printing material from the result of scanning by the image reader 40.

The printing material setting screen 350 includes "PRINTING MATERIAL LAYOUT" field 351 and "PRINTING MATERIAL TYPE" pull-down menu 352. The printing material setting screen 350 includes "PRINTING MATERIAL SIZE" radio buttons 353, 354, "STANDARD SIZE" pull-down menu 355, "LENGTH" text box 356 of non-fixed size, and "WIDTH" text box 357. The printing material setting screen 350 includes "WITH OR WITHOUT MARGINS" radio buttons 358, 359, "LEADING EDGE" text box 360, "TRAILING EDGE" text box 361, "LEFT EDGE" text box 362, and "RIGHT EDGE" text box 363. The printing material setting screen 350 includes "NUMBER OF DIVIDED SURFACES" text box 364, "DIVISION PATTERN" radio buttons 365, 366, 376, "LENGTH DIRECTION" text box 368 when dividing with the same size, and "WIDTH DIRECTION" text box 369. The printing material setting screen 350 includes "DELIVERY NOTE/LABEL" text box 370, "USED SURFACE" radio buttons 371, 372, "Y" text box 373, "OK" button 374, and "CANCEL" button 375.

The following values are set for each setting item on the printing material setting screen 350. The value set for each item is reflected in "PRINTING MATERIAL LAYOUT" field 351. The item selected in the "PRINTING MATERIAL TYPE" pull-down menu 352 is reflected in the "PRINTING MATERIAL TYPE" pull-down menu 310 in the print item setting screen 300 described above. The item selected in "PRINTING MATERIAL TYPE" pull-down menu 352 is set as a type of the printing material formed by the image forming apparatus 1. In FIG. 6, "PERFORATED PAPER" is set for this item.

The item selected by "PRINTING MATERIAL SIZE" radio buttons 353 and 354 is set as an outer size of the printing material. When "STANDARD SIZE" radio button 353 is selected, the standard size such as A4 or LTR can be selected from "STANDARD SIZE" pull-down menu 355. When "NON-FIXED SIZE" radio button 354 is selected, the printing material size is set by inputting values in the "LENGTH" text box 356 and the "WIDTH" text box 357 of non-fixed size. As to "LENGTH" text box 356 of non-fixed size, the length in the conveyance direction of the printing material is input, and as to "WIDTH" text box 357, the length of the printing material in a direction orthogonal to the conveyance direction is input. In FIG. 6, the standard size of "A4" has been selected.

As to "WITH OR WITHOUT MARGINS" radio buttons 358, 359, they are items for setting whether or not to set a margin in the printing material. When "N" radio button 258 is selected, "0" is displayed in all of the "LEADING EDGE" text box 360, "TRAILING EDGE" text box 361, "LEFT EDGE" text box 362, and "RIGHT EDGE" text box 363. When "Y" radio button 259 is selected, a predetermined value can be set in each of the "LEADING EDGE" text box 360, the "TRAILING EDGE" text box 361, "LEFT EDGE" text box 362, and "RIGHT EDGE" text box 363. In FIG. 6, the "N" radio button 358 is selected. Therefore, "0" is displayed in all of the "LEADING EDGE" text box 360, "TRAILING EDGE" text box 361, "LEFT EDGE" text box 362, and "RIGHT EDGE" text box 363.

As to "NUMBER OF DIVIDED SURFACES" text box 364, it is an item for setting the number of divided surfaces by the perforations R. In the standard setting, "1" is set in "NUMBER OF DIVIDED SURFACES" text box 364 however, any number of divided surfaces of the printing material can be set by inputting a numerical value in "NUMBER OF DIVIDED SURFACES" text box 364. As to "DIVISION PATTERN" radio buttons 365, 366, and 376, they are items which can be selectable when a numerical value of "2" or more is input to "NUMBER OF DIVIDED SURFACES" text box 364. Items selected by radio buttons 365, 366, and 376 designate the size to be divided.

When "SAME SIZE DIVISION" radio button 365 is selected, it becomes possible to input values in "LENGTH DIRECTION" text box 368 and "WIDTH DIRECTION" text box 369 of the same size division, respectively. In "LENGTH DIRECTION" text box 368, the number of divided surfaces in the conveyance direction of the printing material is input. In "WIDTH DIRECTION" text box 369, the number of divided surfaces in the direction orthogonal to the conveyance direction of the printing material is input. As a result, the entire division pattern of the printing material is set. In a case where "DELIVERY NOTE/LABEL" radio button 366 is selected, it becomes possible to set "DELIVERY NOTE/LABEL" text box 370. As to "DELIVERY NOTE/LABEL" text box 370, it can be set by selecting a default size such as "EAIJ STANDARD" or "D LABEL", etc. In a case where "OTHER (CUSTOMIZE: SET ON LAYOUT)" radio button 366 is selected, a position of the perforation R can be freely set by moving the perforation R on "PRINTING MATERIAL LAYOUT" field 351. In FIG. 6, "SAME SIZE DIVISION" radio button 365 is selected, and "3" is input to "LENGTH DIRECTION" text box 368 and "3" is input to "WIDTH DIRECTION" text box 369, and the perforated paper which is divided into nine areas, each having the same size, is set.

The items selected in "USED SURFACE" radio buttons 371 and 372 set the presence or absence of the used surface (cut-off portion) of the printing material. When the "N" radio button 371 is selected, it is set that there is no used surface. When "Y" radio button 372 is selected, the number of used surfaces can be set in "Y" text box 373. Further, when "Y" radio button 372 is selected, the position of the used surface can be set in "PRINTING MATERIAL LAYOUT" field 351. The setting method is performed by selecting a used print surface on the printing material layout displayed in "PRINTING MATERIAL LAYOUT" field 351. FIG. 6 illustrates a case where "Y" radio button 372 is selected and "1" is input to text box 373. The position of the used surface is set to a surface 376 at the right side of the trailing edge.

By pressing "OK" button 374 after setting each of the above items, the set printing material information is confirmed and stored in the storage of the computer 200. After storing the printing material information, the printer driver closes the printing material setting screen 350. In a case where "CANCEL" button 375 is pressed, the printer driver returns the display to the print item setting screen 300 after closing the printing material setting screen 350. In this case, the printing material setting items which have been set by that time are discarded without being stored.

When using the operation panel, by pressing "OK" button 374 after setting each of the above items, the set printing material information is confirmed and stored in the RAM 103 of the CPU circuit portion 101. After storing the printing material information, the CPU circuit portion closes the printing material setting screen 350. In a case where "CANCEL" button 375 is pressed, the CPU circuit portion 101 returns the display to the print item setting screen 300 after closing the printing material setting screen 350. In this case, the printing material setting items which have been set by that time are discarded without being stored.

<Determining Whether Automatic Double-Sided Printing is Possible or Not>

Figures 7, 8:
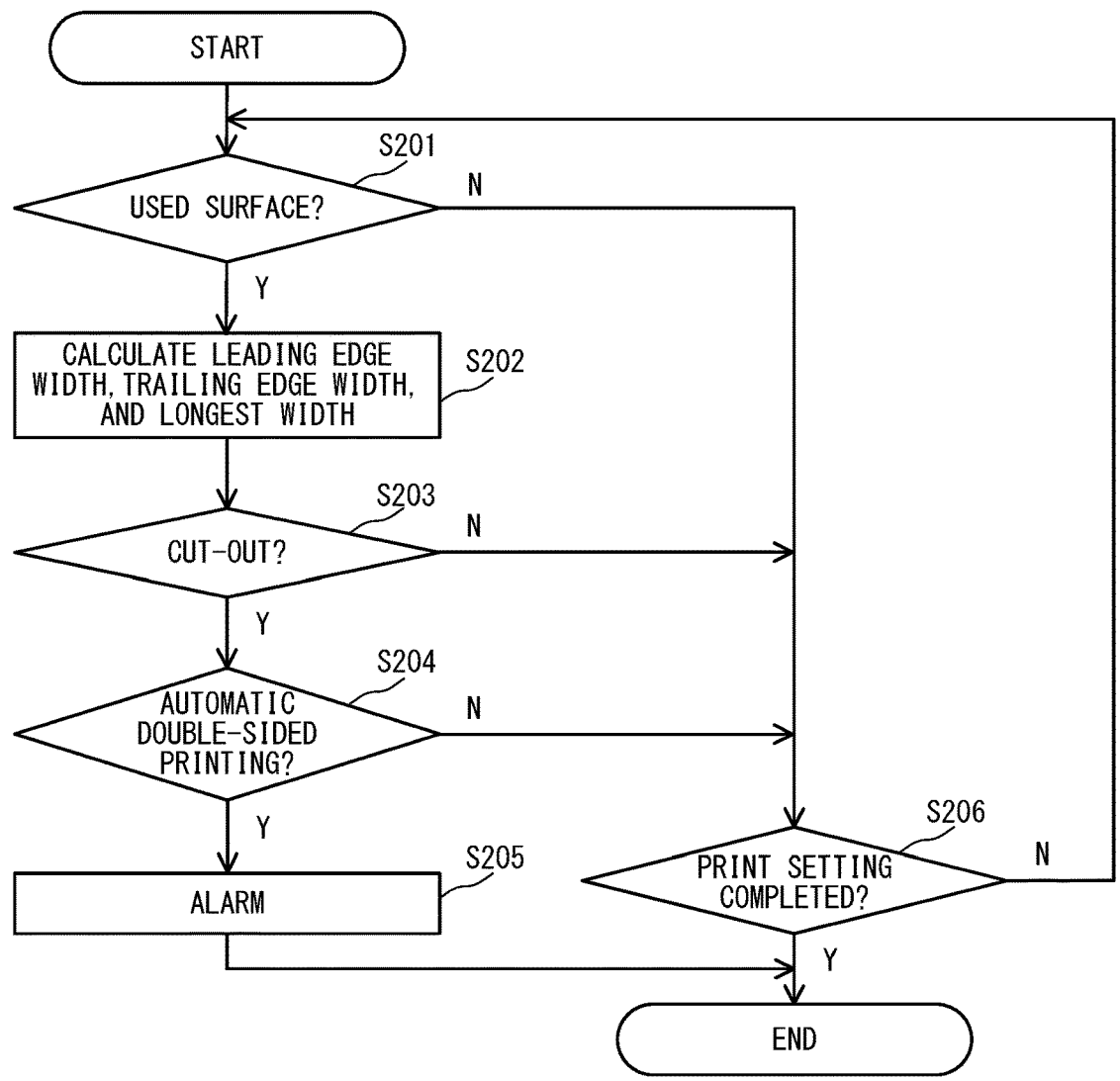
FIG. 7 is a flow chart representing a print setting process.
FIG. 8 is an explanatory diagram of an alarm display.

FIG. 7 is a flowchart representing a print setting process including a determination as to whether the automatic double-sided printing is possible or not according to the present embodiment. This process is executed by the printer driver of the computer 200 or the CPU circuit portion 101 of the image forming apparatus 1. Here, a description is made for a case where the process is performed by the CPU circuit portion 101. This process is performed based on the printing material information included in the print information. This process is started at a timing when the user inputs the print setting item in the process of STEP S101 of FIG. 4. In this case, the perforated paper is used as the printing material P.

The CPU circuit portion 101 determines whether or not the printing material P has a used (cut-off portion) surface (STEP S201). Specifically, the CPU circuit portion 101 makes this determination depending on which of "USED SURFACE" radio buttons 371 and 372 in the printing material setting screen 350 of FIG. 6 is selected. The CPU circuit portion 101 determines that there is the used surface when the radio button 372 is selected, while the CPU circuit portion 101 determines that there is no used surface when the radio button 371 is selected.

When there is the used surface (STEP S201: Y), based on the information input to "PRINTING MATERIAL LAYOUT" field 351, from which the position of the used surface in FIG. 6 has been set, the CPU circuit portion 101 calculates a width of the printing material P at each position in the conveyance direction of the printing material (STEP S202). Here, the leading edge, the trailing edge, and the length of the longest portion in the conveyance direction of the printing material are calculated. As to "PRINTING MATERIAL LAYOUT" field 351 shown in FIG. 6, the width of each position in the conveyance direction is as follows. In "PRINTING MATERIAL LAYOUT" field 351, the leading edge is in the upper side of the screen at the time of sheet-passing.

| Conveyance direction position | Length |
|---|---|
| Leading edge width | 210 mm |
| Trailing edge width | 140 mm |
| Longest width | 210 mm |

The CPU circuit portion 101 determines, based on the calculated width of each position of the carrying direction, presence/absence of the cut-out (notch), and the size of the same at each position of the leading edge and the trailing edge (STEP S203). Specifically, the CPU circuit portion 101 compares the longest width with the calculated leading edge width or the trailing edge width to determine whether the difference therebetween is not more than or equal to a predetermined difference or not. In the above example, the leading edge width is equal to the longest width and the trailing edge width is 67% of the longest width. Therefore, in this case, it is determined that there is no cut-out on the leading edge side and there is a cut-out on the trailing edge side.

The presence or absence of a cut-out is determined by the amount of deviation and is not determined by whether or not the leading edge width or the trailing edge width matches with the longest width. The reason thereof will be explained. In a case where the sheet-passing is performed with a side having the cut-out portion being the leading edge, the leading edge of the cut-out portion may be caught in the original conveyance path, thereby the faulty sheet-passing may occur. However, when the width of the cut-out portion is sufficiently small, the influence of the cut-out portion of the printing material posture is small and the sheet-passing can be performed. Therefore, the presence or absence of a cut-out is determined by the amount of deviation.

In a case where the difference between the longest width and the leading edge width or the trailing edge width is equal to or more than the predetermined difference, the faulty sheet-passing may occur during the automatic double-sided printing. In a case where the difference between the longest width and the leading edge width or the trailing edge width is less than the predetermined difference, it can be determined that the sheet-passing can be performed during the automatic double-sided printing. In determining whether or not the sheet-passing can be performed for printing material having the cut-out portion at the leading edge side, the threshold value of the width of the cut-out portion differs depending on the shape of the original conveyance path. Therefore, depending on the shape of the original conveyance path, it may be determined that the automatic double-sided printing of the printing material with even a small cut-out is not possible.

When there is the cut-out (STEP S203: Y), the CPU circuit portion 101 determines whether the automatic double-sided printing is set or not (STEP S204). The CPU circuit portion 101 performs this determination depending on which of "SINGLE-SIDED" or "DOUBLE-SIDED" is selected in "SINGLE-SIDED/DOUBLE-SIDED" pull-down menu 313 of FIG. 5. In a case where "SINGLE-SIDED" is selected, the automatic double-sided printing is not set, and in a case where "DOUBLE-SIDED" is selected, the automatic double-sided printing is set.

When automatic double-sided printing is set (STEP S204: Y), the CPU circuit portion 101 determines that there is a problem in conveying the printing material P and the printing material P cannot be used for (or is not applicable to) the automatic double-sided printing. In this case, the CPU circuit portion 101 displays an alarm display on the operation panel 50 representing that the printing material P cannot be used for the automatic double-sided printing because it is not possible to (or is not applicable to) perform the sheet-passing (STEP S205). FIG. 8 is an exemplary diagram of the alarm display. The CPU circuit portion 101 ends the process in a case where "OK" button on the alarm display screen is pressed. When this process is performed by the printer driver, the printer driver displays an alarm display screen on the display of the computer 200.

In a case where there is no used surface in the printing material P (STEP S201: N), or in a case where there is no cut-out (STEP S203: N), or in a case where the automatic double-sided printing is not set (STEP S204: N), the CPU circuit portion 101 determines that there is no problem in conveying the printing material P. In this case, the CPU circuit portion 101 determines whether or not the print setting is completed (STEP S206). The CPU circuit portion 101 determines that the print setting is completed when either "PRINT" button 316 or "CANCEL" button 317 of the print item setting screen 300 of FIG. 5 is selected (STEP S206: Y). When neither "PRINT" button 316 nor "CANCEL" button 317 is selected (STEP S206: N), the CPU circuit portion 101 returns to the process of S201 and continues monitoring the automatic double-sided printing settings for the printing material P that cannot be automatically double-sided printed.

The image forming apparatus 1 of the present embodiment as described above determines whether the automatic double-sided printing is possible for the printing material P in a partial cut-off state. Therefore, it is possible to prevent the faulty sheet-passing of the printing material P which is in a partial cut-off state. In the above description, an example of determining whether or not the automatic double-sided printing is possible when creating print information has been described; however, this determination process may be performed at a timing when the CPU circuit portion 101 obtains the print information or at a timing when the image formation process is started.

Modification Example

In the above description, it is determined whether the automatic double-sided printing is possible or not before starting the faulty sheet-passing based on the printing material information such as the shape of the printing material P input by the user. If the shape of the printing material set by the user is different from the shape of the printing material P to which the sheet-passing is actually performed, or if the printing material shape other than a rectangular shape is not expected at all, it is difficult for the image forming apparatus 1 to determine whether the automatic double-sided printing is possible or not based on the shape of the printing material P. Here, a description is made for a configuration in which the shape of the printing material is detected in a main body of the image forming apparatus 1 after starting the sheet-passing. In this configuration, it is determined whether automatic double-sided printing is possible or not, based on the shape of the printing material which is predicted based on a result of the detection, to thereby prevent the above-mentioned difficulties.

In the image forming apparatus 1, a sensor is arranged along the original conveyance path in order to detect the shape of the printing material P. In FIG. 1, the conveyance sensor 60 is provided along the original conveyance path 53. Here, a description is made for a case where the shape of the printing material P is detected based on a detection result of the conveyance sensor 60 arranged in the vicinity of the registration roller pair 5. However, a position of the sensor is not limited to the above as long as the sensor is provided along the original conveyance path. For example, the shape of the printing material may be detected from a detection result of a sensor provided on the downstream side of the separation roller pair 4. A conveyance sensor 60 is a flag sensor, and a plurality of the conveyance sensors 60 are arranged in a direction orthogonal to the conveyance direction of the printing material P. A detection result of the conveyance sensor 60 is transmitted to the CPU circuit portion 101 via the printing material conveyance control unit 110. The CPU circuit portion 101 detects the shape of the printing material P based on the detection result of the conveyance sensor 60.

Figure 9A:
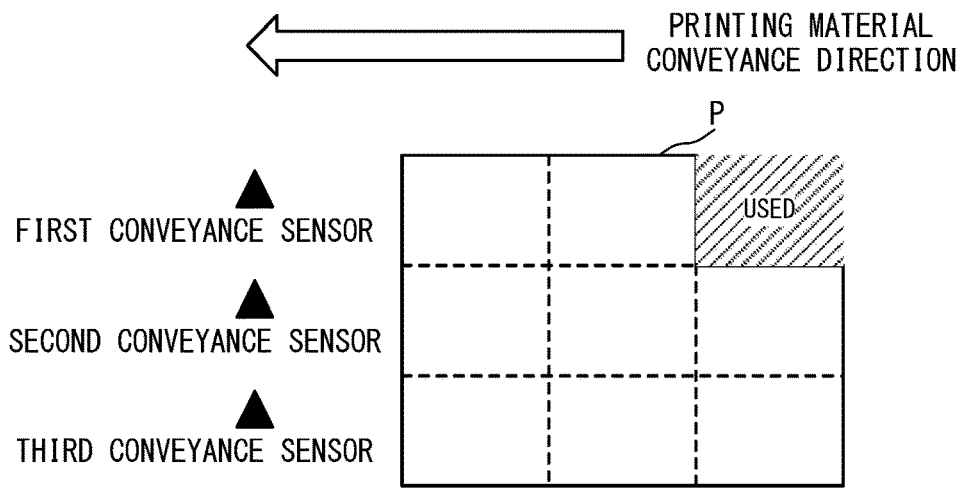
FIG. 9A and FIG. 9B are explanatory diagrams of a detection result of a conveyance sensor.
Figure 9B:
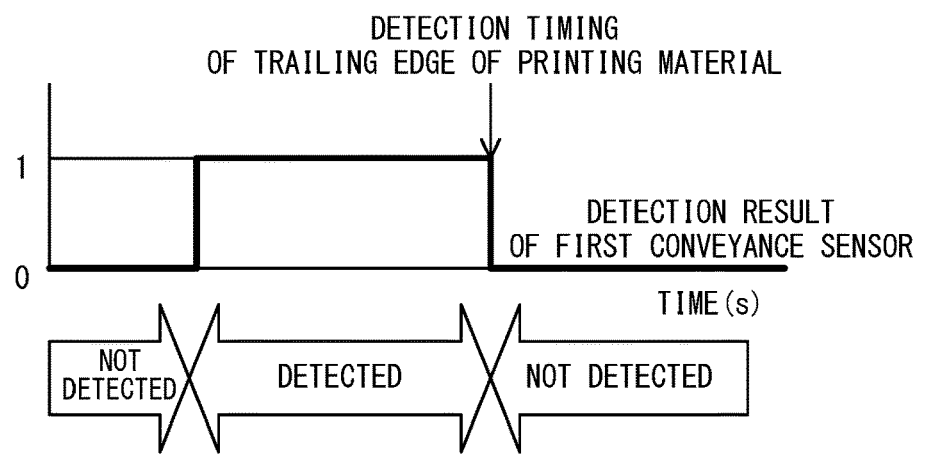
Figure 9B:
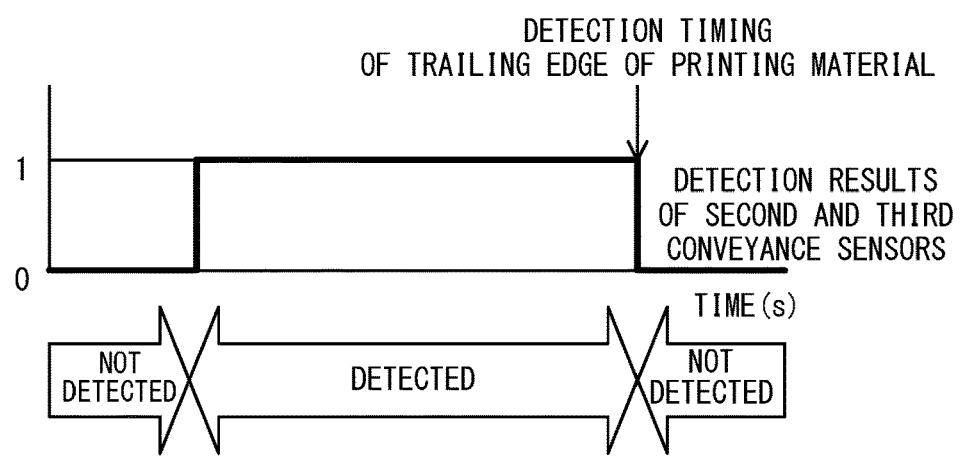

FIG. 9A and FIG. 9B are explanatory diagrams of the detection result of the conveyance sensor 60. FIG. 9A represents an arrangement of three conveyance sensors (first to third conveyance sensors). FIG. 9A represents a state in which the printing material P having a cut-out is conveyed. FIG. 9B is an example diagram of the detection result of the printing material P having a notch by the conveyance sensor 60. The number of the conveyance sensors may be two or more, and is not limited to the above example.

The detection result of the conveyance sensor 60 (hereinafter, referred to as "OUTPUT SIGNAL VALUE") is binary data. A signal output value of "1" means that the conveyance sensor 60 has detected the printing material P. A signal output value of "0" means that the conveyance sensor 60 has not detected the printing material P. A timing at which the output signal value changes from "0" to "1", that is, a timing at which the printing material P is changed from an undetected state to a detected state, represents the leading edge of the printing material P. Contrary to this, a timing at which the output signal value changes from "1" to "0" represents the trailing edge of the printing material P.

In the example of FIG. 9A, there is a used surface at the position of the first conveyance sensor. Therefore, as shown in FIG. 9B, the timing at which the output signal value of the first conveyance sensor changes from "1" to "0" is earlier than the timing at which the second and third conveyance sensors change from "1" to "0". If the timing at which the output signal value changes from "1" to "0" is equal for the first to third conveyance sensors, it can be determined that there is no cut-out at the trailing edge. Since there is at least one conveyance sensor with different output signal value changing timing, it can be determined that the printing material has a cut-out at its trailing edge.

Figure 10:
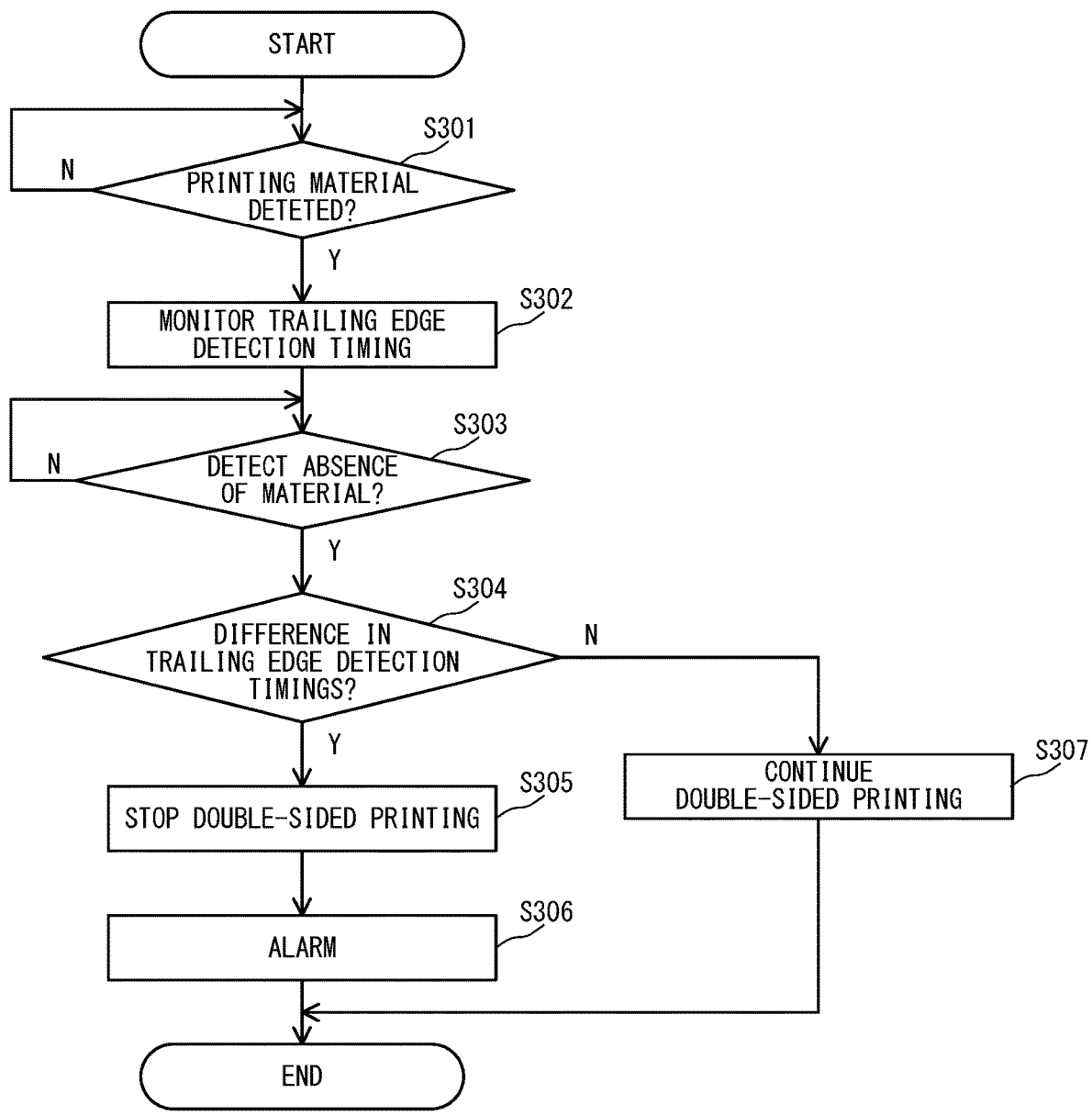
FIG. 10 is a flowchart representing a process of determining whether automatic double-sided printing is applicable or not.
Figure 11A:
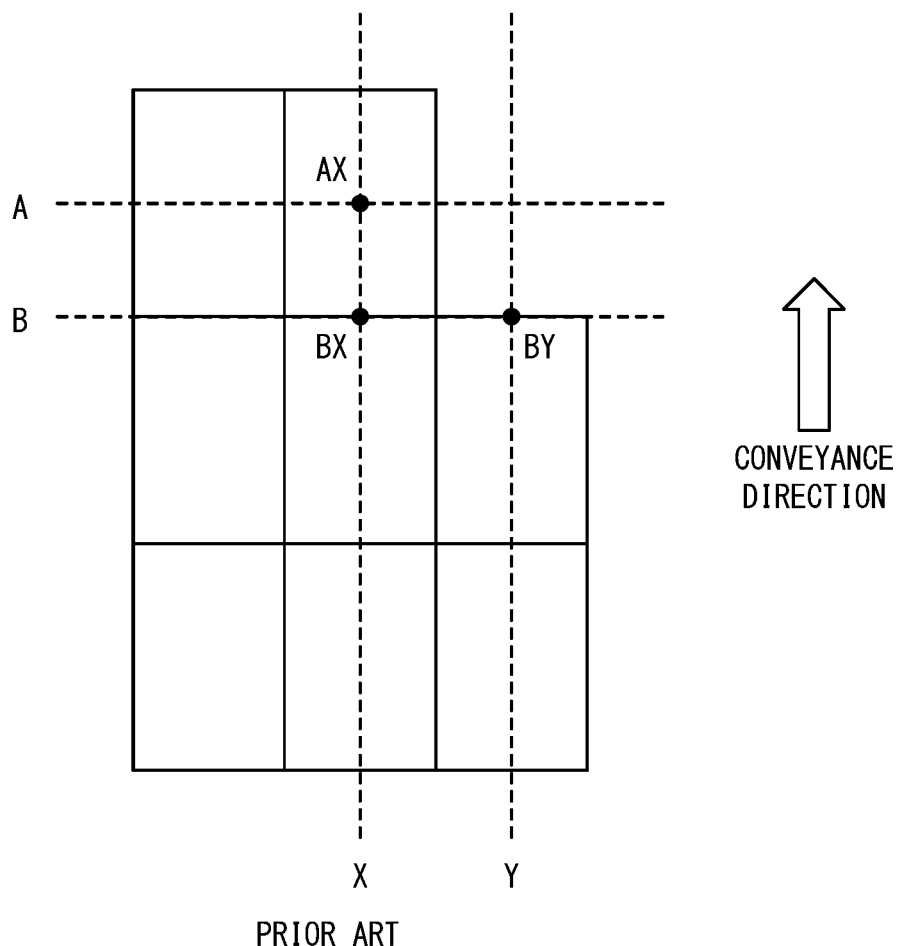
FIG. 11A and FIG. 11B are explanatory diagrams of sheet-passing states when a part of a sheet of perforated paper is cut off.
Figure 11B:
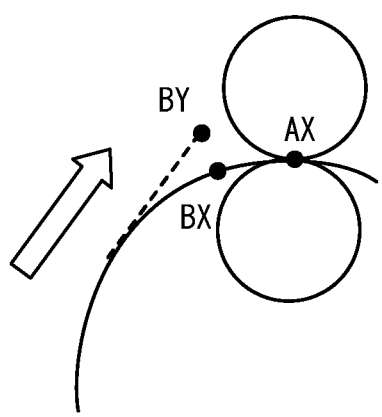

FIG. 10 is a flowchart representing a process for determining whether the automatic double-sided printing is possible or not using the conveyance sensor 60. This process is performed only when the automatic double-sided printing is set at the time of setting the print information. In this example, the perforated paper is used as the printing material P.

The CPU circuit portion 101 determines whether any of the conveyance sensors (first to third conveyance sensors) have detected the printing material P or not (STEP S301). The CPU circuit portion 101 determines detection of the printing material P according to whether the output signal value of the conveyance sensor 60 has changed from "0" to "1".

In a case where at least one of the first to third conveyance sensors detects the printing material P (STEP S301: Y), the CPU circuit portion 101 monitors the timing at which the trailing edge of the printing material P is detected (STEP S302). The CPU circuit portion 101 monitors the timing at which the output signal value of the conveyance sensor 60 changes from "1" to "0". The CPU circuit portion 101 temporarily stores the timing (the trailing edge detection timing) at which the output signal value changes from "1" to "0" in the RAM 103.

The CPU circuit portion 101 waits until all conveyance sensors (first to third conveyance sensors) detect the absence of the printing material P (STEP S303: N). The CPU circuit portion 101 determines whether the absence of the printing material P is detected or not depending on whether the output signal value of the conveyance sensor 60 has changed from "1" to "0" or not. In a case where all the conveyance sensors (first to third conveyance sensors) detect the absence of the printing material P (STEP S303: Y), it means that the trailing edge of the printing material P has passed a detection position of the conveyance sensor 60. When the trailing edge of the printing material P passes through the detection position of the conveyance sensor 60, the shape of the printing material P can be predicted.

The CPU circuit portion 101 determines whether or not there is a difference in detection timing of each of the trailing edges of the printing material P (STEP S304). The CPU circuit portion 101 compares each of the trailing edge detection timing of each of the conveyance sensors (first to third conveyance sensors) stored in the RAM 103 to determine whether there is a difference or not. When there is no difference in the trailing edge detection timing (STEP S304: N), since the trailing edge of the printing material P does not have cut-out and there is no possibility of the faulty sheet-passing during the automatic double-sided printing, the CPU circuit portion 101 continues the automatic double-sided printing of the printing material P (STEP S307).

When there is a difference in the trailing edge detection timing (STEP S304: Y), the CPU circuit portion 101 determines that there is a cut-out at the trailing edge of the printing material P which may cause the faulty sheet-passing during automatic double-sided printing. Thus, the CPU circuit portion 101 stops the automatic double-sided printing (STEP S305). In this case, the CPU circuit portion 101 discharges the printing material P which has a printed front surface to the outside of the image forming apparatus 1. In normal automatic double-sided printing, at a timing when the trailing edge of the printing material P which has the printed front surface reaches the double-sided reversal position and after the reversing roller pair 62 is stopped, the conveyance direction is reversed by rotating the reversing roller pair 62 in a reverse direction. However, if there is a possibility that the faulty sheet-passing occurs for the printing material P, the reversing roller pair 62 does not rotate in the reverse direction during automatic double-sided sheet-passing and the printing material P is discharged to the original discharge tray 9 as it is.

The CPU circuit portion 101 displays an alarm display on the operation panel 50 of the image forming apparatus to represent that the printing material P cannot be used for automatic double-sided printing (STEP S306). The CPU circuit portion 101 ends the process when "OK" button on the alarm display screen of FIG. 8 is pressed.

In addition to a configuration in which multiple flag sensors are aligned in a direction perpendicular to the conveyance direction, the conveyance sensor can be configured to use line sensors. The line sensors are arranged in a direction orthogonal to the conveyance direction. In a case where the line sensors are used, the shape detection accuracy of the printing material P is improved. Further, in the above description, the CPU circuit portion 101 determines whether the automatic double-sided printing is applicable or not however, this determination may be made by the CPU circuit portion 151 of the printing material conveyance control unit 110. In this case, the detection result of the conveyance sensor 60 is not transmitted to the CPU circuit portion 101. The trailing edge detection timing of the printing material P is stored in the RAM 153. When the CPU circuit portion 151 determines that there is a possibility of faulty sheet-passing during automatic double-sided printing, the CPU circuit portion 151 notifies the CPU circuit portion 101 of the possibility of faulty sheet-passing. The CPU circuit portion 101 performs processing for displaying an alarm display in response to this notification.

The image forming apparatus 1 of the present embodiment as described above determines whether the automatic double-sided printing is possible or not for the printing material P which is in a partial cut-off state. Therefore, it is possible to prevent the faulty sheet-passing of the printing material P in the partial cut-off state.

As described above, regardless of the shape of the printing material P set by the user and the shape of the printing material P that is actually fed to perform sheet-passing, the image forming apparatus 1 can prevent the printing material P in the partially cut-off state from faulty sheet-passing. As described above, according to the present disclosure, the faulty sheet-passing during the automatic double-sided printing is prevented even if the printing material is in the partially cut-off state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-180877, filed Oct. 28, 2020, which is hereby incorporated by reference herein in its entirety.

What is claimed is:

1. An image forming apparatus comprising:
an image former configured to form an image on a sheet;
a user interface provided to receive first information and second information provided by a user, the first information being related to a notch of the sheet on which the image is to be formed by the image former and the second information being related to whether automatic double sided printing is to be performed or not; and
a processor configured to determine that the sheet is not applicable to sheet-passing in a case where the first information indicates that the sheet has the notch and a difference between a longest width and a leading edge width or a trailing edge width is greater than or equal to a predetermined difference in a direction orthogonal to a conveyance direction of the sheet and the second information indicates that the automatic double-sided printing is to be performed.

2. The image forming apparatus according to claim 1, wherein the processor is configured to:
compare the longest width with the leading edge width or the trailing edge width; and
determine whether a difference therebetween is less than the predetermined difference or not.

3. The image forming apparatus according to claim 1, wherein the processor is configured to display an alarm display on the user interface in the case where the first information indicates that the sheet has the notch and the difference between the longest width and the leading edge width or the trailing edge width is greater than or equal to the predetermined difference in the direction orthogonal to the conveyance direction of the sheet and the second information indicates that the automatic double-sided printing is to be performed.

4. An image processing apparatus comprising:
a user interface provided to receive first information and second information provided by a user, the first information being related to a notch of a sheet on which an image is to be formed and the second information being related to whether automatic double sided printing is to be performed or not; and
a processor configured to determine that the sheet is not applicable to sheet-passing in a case where the first information indicates that the sheet has the notch and a difference between a longest width and a leading edge width or a trailing edge width is greater than or equal to a predetermined difference in a direction orthogonal to a conveyance direction of the sheet and the second information indicates that the automatic double-sided printing is to be performed.

5. The image forming apparatus according to claim 1, wherein the user interface includes a display configured to display a screen to allow a user to designate a position of the notch of the sheet.

6. The image forming apparatus according to claim 1, wherein the user interface is configured to allow a user to set, via the user interface, perforated paper as the sheet on which the image is formed.

7. The image forming apparatus according to claim 6, wherein the user interface is configured to allow a user to set, via the user interface, a number of divided surfaces of the perforated paper.

8. The image forming apparatus according to claim 1, wherein the processor is configured to determine that it is possible to perform the automatic double sided printing in a case where the first information input to the user interface does not indicate that the sheet has the notch.

9. The image forming apparatus according to claim 1, wherein the user interface includes a display configured to display a screen to allow a user to designate a position of the notch of the sheet, and
wherein the processor is configured to determine whether the automatic double sided printing is possible or not based on the position of the notch of the sheet designated via the display.

10. An image forming apparatus comprising:
an image former configured to form an image on a sheet;
a user interface configured to allow a user to set, via the user interface, perforated paper as the sheet on which the image is to be formed; and
a processor,
wherein information related to a position of a perforated line of the perforated paper is input via the user interface, and
wherein the processor is configured to determine whether the automatic double sided printing is possible or not based on the information related to the position of the perforated line input via the user interface.

11. The image forming apparatus according to claim 10, wherein the user interface is provided to receive first information and second information provided by a user, the first information being related to whether the perforated sheet on which the image is to be formed by the image former has a notch or not and the second information being related to whether automatic double sided printing is to be performed or not, and
wherein the processor is configured to determine whether the automatic double sided printing is possible or not based on the position of the perforated line input to the user interface in a case where the first information input to the user interface indicates that the sheet has the notch and the second information input to the user interface indicates that the automatic double sided printing is to be performed.

12. The image forming apparatus according to claim 11, wherein the processor is configured to determine that it is possible to perform the automatic double sided printing in a case where the first information input to the user interface does not indicate that the sheet has the notch.

13. The image forming apparatus according to claim 10, wherein the user interface is configured to allow a user to set, via the user interface, a number of divided surfaces of the perforated paper as the information related to the position of the perforated line of the perforated paper.

\* \* \* \* \*